United States Patent Office 2,867,603
Patented Jan. 6, 1959

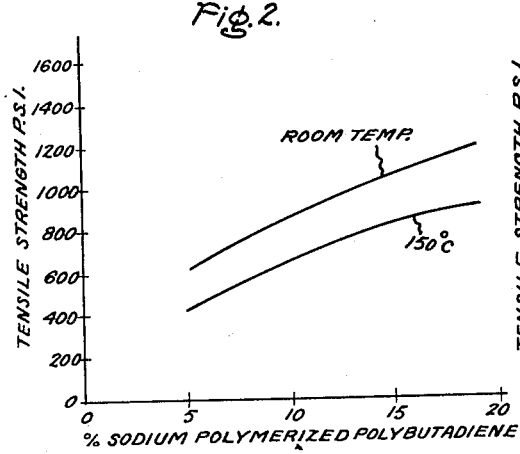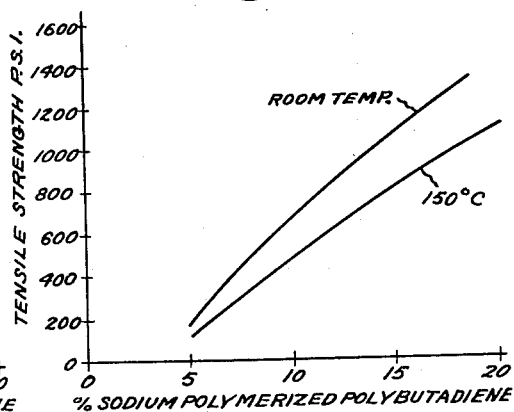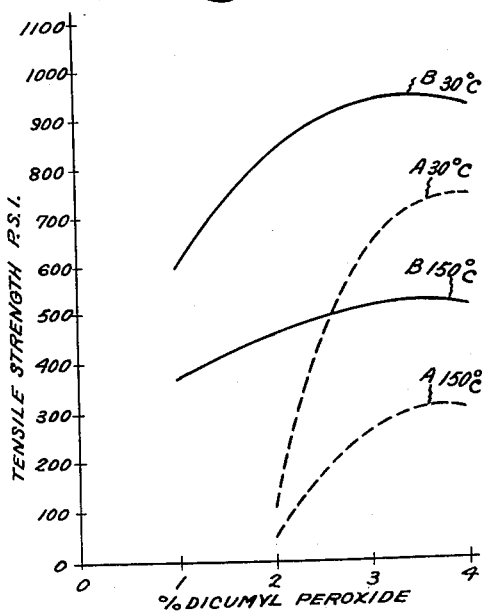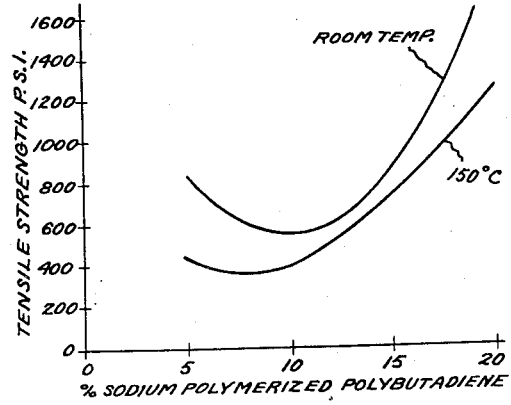
Inventors:
Moyer M. Safford,
Robert L. Myers,
by Paul A. Frank
Their Attorney.

2,867,603

BLENDS OF ORGANOPOLYSILOXANE, POLYBUTADIENE AND DI-α-CUMYL PEROXIDE AND METHOD OF CURING SAME

Moyer M. Safford, Schenectady, and Robert L. Myers, Ballston Lake, N. Y., assignors to General Electric Company, a corporation of New York Application March 27, 1956, Serial No. 574,336

22 Claims. (Cl. 260—45.5)

This invention relates to curable composition comprising blends of (1) organopolysiloxanes, (2) polymerized 1,3-butadiene (hereafter called "polybutadiene"), and (3) di-α-cumyl peroxide, and the cured compositions thereof. More particularly, this invention relates to a method of curing blends of (1) and (2) which comprises treating such blends with di-α-cumyl peroxide.

The features of the invention desired to be protected herein are pointed out with particularity in the appended claims. The invention itself, together with further objects and advantages thereof, may best be understood by reference to the following description taken in connection with the accompanying drawing. In reference to the drawing:

Fig. 1 is a graph of the tensile strength at 150° C. and at 30° C. versus percent di-α-cumyl peroxide contained in a cured, filled organopolysiloxane-polybutadiene blend (straight lines) and the corresponding filled organopolysiloxane composition containing no polybutadiene (broken lines).

Fig. 2 is a graph of the tensile strength at 150° C. and at room temperature versus percent polybutadiene contained in a cured, filled vinylmethylpolysiloxane-polybutadiene blend.

Fig. 3 is a graph of the tensile strength at 150° C. and at room temperature versus percent polybutadiene contained in a cured, filled devolatilized vinylmethylpolysiloxane-polybutadiene blend.

Fig. 4 is a graph of the tensile strength at 150° C. and at room temperature versus percent polybutadiene contained in a cured, filled vinylmethylphenylpolysiloxane-polybutadiene blend.

Because silicone rubber is more exepnsive than hydrocarbon rubbers, attempts have been made to lower the cost thereof while still retaining as much as possible the excellent properties of silicone rubber. One method that has been used is the incorporation of silicone gums into hydrocarbon latices, gums, or rubbers, and curing the resulting product with such peroxides as benzoyl peroxides, etc. Although these compositions are less expensive than silicone rubber, they do not possess many of its desirable properties; for example, these blends do not possess the elevated temperature strength or stability that is so characteristic of silicone rubbers.

We have now discovered that when polybutadiene is blended with organopolysiloxanes and cured with di-α-cumyl peroxide a product is produced which has excellent high temperature sterngth and stability. Unexpectedly, this blend can be cured with di-α-cumyl peroxide within a short period of time, such as, for example, 15–30 minutes to produce, by a "short cure" method attractive to commercial production, a cured blend having excellent physical and electrical properties. It could not have been predicted that the blend would cure within this short period since as disclosed in the prior art polybutadiene could be cured by treatment with heat or other peroxides only over extended periods of time. Furthermore, the uncured peroxide-containing blends can be worked at high temperatures, such as at 130°–140° C., at which temperature it is desirable to mill these blends and at which temperature the other peroxides commonly used prematurely decompose. In addition, because of heat stability the di-α-cumyl peroxide containing blends can be shipped in commerce without deleterious effects.

In general, the invention can advantageously be carried out by milling polybutadiene and the organopolysiloxane on differential rubber rolls (which can advantageously be heated if desired) as di-α-cumyl peroxide is added and intimately incorporated into the blend. Since it is more difficult to obtain a homogeneous blend at lower temperatures, milling is generally carried out at elevated temperatuers such as about 100–135° C.

Thereupon, the blend can be fabricated, molded, extruded or calendered, etc., by suitable methods. The temperature at which the shaping operation is effected can be varied widely depending on whether it is desired that shaping and curing be accomplished in one operation. If desired, the composition can be cured and shaped by a final heat treatment at about 150° C. or higher but below the decomposition temperature of the polymer. Curing of the blend can be effected at ordinary pressures or at super-atmospheric pressure, such as from 10 to 1000 pounds per square inch or more in the mold or press. If the surface cure alone is desired without affecting the interior, blends containing no peroxide may be extruded into a solution containing the peroxide, and thereupon heat-cured to produce a case hardened polymer. Thin films or filaments extruded and heated in this manner will be sufficiently cured throughout.

The blend of organopolysiloxane and polybutadiene will hereafter be referred to as "blends" and the di-α-cumyl peroxide-cured blends as "cumyl-cured blends."

1,3-butadiene can enter into a polymer chain by either a 1,2- or 1,4-mode of addition; the 1,2-mode of addition results in the following "dangling vinyl" structure:

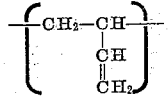

(hereafter called "1,2-polybutadiene") whereas the 1,4 mode of addition results in the following structure:

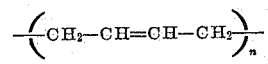

(hereafter called "1,4-polybutadiene"). Two types of catalysts are generally used to polymerize 1,3-butadiene, namely the free-radical and the alkali metal type catalyst. When 1,3-butadiene is polymerized by free-radical type catalysts, such as peroxides, persulfates, etc. in aqueous emulsions, a higher proportion of 1,4-polybutadiene results as compared to the product produced by the alkali metal type catalyst where a higher proportion of 1,2-polybutadiene is obtained. Using free-radical catalysts, one obtains polybutadiene having less than 25% 1,2-polybutadiene.

Although both blends of organopolysiloxanes and free-radical polymerized butadiene (also called "emulsion polybutadiene") or alkali metal polymerized butadiene (also called "alkali metal polybutadiene") can be cured with di-α-cumyl peroxide, the alkali metal polymerized butadiene is cured to a stronger product within a shorter period of time than free-radical polymerized butadiene. This appears to be due to the fact that alkali metal polymerized butadiene which contains larger amounts of "dangling vinyl group" (1,2-polybutadiene) cures more readily with di-α-cumyl peroxide to produce a stronger product than the free-radical cured butadiene which has its residual double bonds "buried" in the chain of the 1,4-polybutadiene. Thus, in order to obtain these stronger products, it is necessary to employ polybutadiene containing larger percentages of the 1,2- type, i. e. over 30% and preferably 50–100% of 1,2-polybutadiene.

Among the alkali metal type catalysts which have been used to produce polybutadiene having high percentages of 1,2-polybutadiene are alkali metals and compounds containing alkali metals. Thus, metals, such as lithium, sodium, potassium, rubidium, cesium, sodium-potassium alloys, and compounds of these metals, such as phenyl isopropyl potassium, triphenyl methyl sodium, lithium butyl, amyl sodium and the like compounds have been used to effect such polymerization.

Whereas free-radical catalysts tend to produce larger amounts of 1,4-polybutadiene, catalysts of the alkali metal type tend to increase the ratio of the 1,2-polybutadiene. However, temperature as well as catalysts affect the type of polymer formed; for example, polybutadiene produced by polymerizing 1,3-butadiene with sodium at 110° C. contains about 15% of the 1,2-polybutadiene whereas 100% of 1,2-type polymer is produced when 1,3-butadiene is polymerized with sodium at −70° C. Although the ratio of the 1,2- to the 1,4-polybutadiene can be determined by ozonization, probably the more accurate method of determining this ration is by the use of infrared spectra. Infrared curves identifying the different types of polymers are found in Dogadkin at al., "Rubber Chemistry and Technology," 24, pp. 591–596 (1951), Hampton, "Anal. Chem., 21, pp. 923-926 (1949) and Meyer, "Ind. Eng. Chem.," 41, pp. 1570–1577 (1949). An excellent description of polybutadiene polymers is found in Whitby, "Synthetic Rubber," pp. 734–757, Wiley and Sons, New York (1954) wherein are described methods of preparing polybutadiene falling within the scope of this invention.

Since molecular weight is related to viscosity, viscosity measurements are a convenient method of expressing the molecular weight. Although polybutadiene gums of a board intrinsic viscosity range can be employed, we advantageously have employed polybutadiene having an intrinsic viscosity of about 1.0 to 8.0 or higher. Optimum properties are obtained using polybutadiene having an intrinsic viscosity of 3.0 to 6.0.

Inherent viscosity is determined by a viscometer, such as an Ostwald viscometer on a 0.25 percent solution of polybutadiene in benzene. This value is calculated as the natural logarithm of the ratio of flow time of the solution to the flow time of the solvent divided by the concentration in grams/100 ml. Intrinsic viscosity $[\eta]$ is obtained by extrapolating the inherent viscosity vs. concentration curve of zero concentration.

The organopolysiloxanes employed in this invention are organopolysiloxanes curable to the solid elastic state. The curable organopolysiloxane or silicone compositions may be highly viscous masses, or gummy elastic solids, depending on the state of condensation, the condensing agent employed, the starting organopolysiloxane used to make the curable organopolysiloxanes, etc. Although curable organopolysiloxanes with which the present invention is concerned are well known, for purposes of showing persons skilled in the art the various organopolysiloxanes which may be employed in the practice of the present invention, attention is directed to the curable organopolysiloxanes disclosed and claimed in Agens Patent 2,448,756; Sprung et al. Patent 2,448,556; Sprung Patent 2,484,595; Krieble et al. Patent 2,457,688; Hyde Patent 2,490,357; Marsden Patent 2,521,528; Warrick Patent 2,541,137; Marsden Patent 2,445,794; etc.

It will, of course, be understood by those skilled in the art that other curable organopolysiloxanes containing the same or different silicon-bonded organic substituents (alkyl, e. g. methyl, ethyl, propyl, butyl, octyl, etc.; alkenyl, e. g. vinyl, allyl, methallyl, etc.; cycloalkenyl, e. g. cyclopentenyl, cyclohexenyl, etc.; aryl e. g. phenyl, tolyl, xylyl, naphthyl, etc.; aralkyl, e. g. benzyl, phenylethyl, etc.; halogenated aryl, e. g. chlorophenyl, dibromophenyl, fluorophenyl, etc.; cycloalkyl e. g. cyclohexyl, etc.; alkinyl e. g. ethinyl, etc.; a plurality of these groups, e. g. methyl and phenyl, vinyl and methyl, vinyl, methyl and phenyl, etc., radicals) connected to silicon atoms by carbon-silicon linkages, may be employed without departing from the scope of the invention.

The particular curable organopolysiloxane used may be any one of those described in the foregoing patents and is generally obtained by condensing a liquid organopolysiloxane containing an average of from about 1.9 to 2.1 preferably from about 1.98 to about 2.01, silicon-bonded organic groups per silicon atom. The usual condensing agents which may be employed and which are well-known in the art may include, for instance, acid condensing agents, e. g. ferric chloride hexahydrate, pheny phosphoryl chloride, and the like; alkaline condensing agents, e. g. quaternary phosphonium hydroxides and alkoxides, solid quaternary ammonium hydroxides, potassium hydroxide, cesium hydroxide, etc. These curable organopolysiloxanes generally comprise polymeric diorganosiloxanes which may contain, for example, from 0 to 2 mol percent copolymerized monorganosiloxane, for example, copolymerized monomethylsiloxane. With saturated organopolysiloxanes, we prefer to use as the starting organopolysiloxane from which the curable organopolysiloxanes are prepared, one which contains about 1.98 to 2.01, inclusive, organic groups, for example, methyl groups per silicon atom where more than about 50% of the silicon atoms in the polysiloxane contain 2 silicon-bonded methyl groups.

The starting organopolysiloxanes used to make the curable organopolysiloxanes by condensation thereof preferably comprise organic substituents consisting essentially of monovalent organic radicals attached to silicon through carbon-silicon linkages and in which the siloxane units consist of units of the structural formula $R_2SiO$ where R is preferably a radical of the group consisting of methyl, vinyl and phenyl radicals. At least 50% of the total number of R groups are preferably methyl radicals. The polysiloxane may be one in which all of the siloxane units are $(CH_3)_2SiO$ or the siloxane may be a copolymer of dimethylsiloxane and a minor amount (e. g., from 1 to 20 mol percent) of any of the following units alone or in combination therewith:

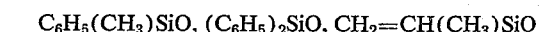

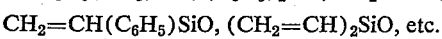

The ratio of organopolysiloxane to polybutadiene can be varied over wide limits. However, we prefer that the organopolysiloxanes comprise less than 50% by weight of the total polymer content. We have advantageously prepared blends in which the saturated organopolysiloxanes comprise 1–5% of the total polymer blend, and blends in which the unsaturated organopolysiloxanes comprise 1–25% of the total weight of the polymer blend. We have found that unsaturated organopolysiloxanes yield products of higher tensile strength than corresponding amounts of saturated organopolysiloxane when blended with high ratios of polybutadiene.

The above described blends can be cured to products of this invention with di-α-cumyl peroxide,

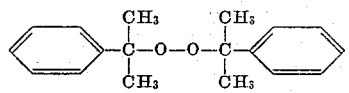

which peroxide can be prepared in the manner described in Karasch et al., "Journal of Organic Chemistry," 15, 753–762 (1950). The proportion of this peroxide to polybutadiene can be varied over wide limits depending on the characteristics desired in the final product. Preferably, we employ the peroxide in amounts ranging from .1 to 10 percent or higher, based on weight of polymer. Optimum properties and curing time are obtained with about from 1 to 7 percent of peroxide based on weight of polymer.

In order that those skilled in the art may better understand how the present invention may be practiced, the following examples are given by way of illustration and not by way of limitation. All parts are by weight.

EXAMPLE 1

A rubbery polymer was prepared from 1,3-butadiene and finely divided sodium using the technique described in Marvel et al., "J. Polymer Science I," p. 275 (1946). The following procedure was employed: Into clean, dry bottles was placed 0.1 g. of finely divided sodium dispersed in toluene. Thereafter, 25 g. of 1,3-butadiene was charged as a liquid. A small amount of the butadiene was allowed to evaporate to displace any air remaining in the bottle. The bottles were capped and rotated at 30° C. for a period of 48 hours. The residual catalyst was deactivated by adding 15 ml. of a 10% solution of absolute alcohol in benzene. The rubber was recovered by precipitation from a benzene solution by addition of ethyl alcohol until polymer no longer precipitated. To this precipitated product was added 0.1% of phenyl-$\beta$-naphthylamine as an antioxidant. This unwashed polymer had an intrinsic viscosity of 6.0 when measured in benzene solution. By infrared analysis, this product contained at least 60% of 1,2-polybutadiene.

EXAMPLE 2

A methyl polysiloxane gum was prepared by heating octamethylcyclotetrasiloxane with 0.01% by weight of KOH at 150° C. for about 6 hours. This gum had a room temperature viscosity of about $1 \times 10^6$ centipoises.

A series of compositions were prepared by blending on a rubber mill (1) 100 parts of the silicone gum prepared in Example 2, (2) 35 parts of silica aerogel (Santocel CS), (3) 2 parts of zinc oxide, (4) 5 parts of the polybutadiene prepared in Example 1, and (5) varying amounts of di-$\alpha$-cumyl peroxides. These compositions were cured in a mold for 30 minutes at 170° C. and their tensile strengths measured at room temperature and at 150° C. The results are given in Table I.

Table I

| Example | Parts Di-$\alpha$-cumyl Peroxide | Tensile Strength 30° C. | Tensile Strength 150° C. |
| --- | --- | --- | --- |
| 3 | 1 | 603.6 | 382 |
| 4 | 2 | 882 | 512 |
| 5 | 3 | 952 | 497 |
| 6 | 4 | 935.3 | 536 |

The comparison of the tensile strength of the cured blends as compared to the corresponding cured non-polybutadiene containing silicone compositions is presented in Fig. 1. In the graph contained therein the tensile strengths at 30° C. and 150° C. of the cured compositions with and without polybutadiene are plotted against percent di-cumyl peroxide. In this figure A 30° C. and A 150° C. represent the tensile strength of the corresponding non-polybutadiene containing silicone composition at the temperatures indicated and B 30° C. and B 150° C. represent the tensile strength of the polybutadiene containing silicone compositions at the corresponding temperatures. From this figure, it is evident that small amounts of polybutadiene markedly improve the tensile strength of the silicone composition.

Blends of silicone gum (Example 2) and polybutadiene (Example 1) can also be prepared and cured with di-$\alpha$-cumyl peroxide without incorporating any filler therein. The blends were prepared by mixing on a rubber mill and cured in a press at 150° C. The results are presented in Table II.

Table II

| Ex. | Composition | Properties |
| --- | --- | --- |
| 7 | 87% silicone gum. 10% sodium polymerized polybutadiene. 3% dicumyl peroxide. | soft rubbery product—T/S 30.7 p. s. i.—300% elongation at 30° C. |
| 8 | 77% silicone gum. 20% sodium polymerized polybutadiene. 3% dicumyl peroxide. | medium firm rubbery product—T/S 155 p. s. i.—300% elongation at 30° C. |
| 9 | 57% silicone gum. 40% sodium polymerized polybutadiene. 3% dicumyl peroxide. | firm soft rubbery product—T/S 340 p. s. i.—300% elongation at 30° C. |
| 10 | 10 silicone gum. 87% sodium polybutadiene. 3% dicumyl peroxide. | hard product. |

In contrast to cured unfilled silicone rubber itself, which is a weak material, the properties of the cured unfilled blends can be varied from a soft rubbery product to a hard product depending on the composition used. Since fillers tend to diminish the electrical properties, it is advantageous to use the cured blends of this invention which have excellent electrical properties.

In addition to the saturated organopolysiloxanes described above, unsaturated organopolysiloxanes can also be employed in preparing blends. These unsaturated organopolysiloxanes may contain only unsaturated silicon-bonded groups or they may contain unsaturated groups as well as saturated groups. Examples of silicon-bonded unsaturated groups are alkenyl radicals, e. g. vinyl, methyl vinyl, allyl, methallyl, etc.; cycloalkenyl, e. g. cyclopentenyl, cyclohexenyl, etc.; alkinyl, e. g. ethinyl, etc.

Typical examples of unsaturated organopolysiloxanes comprise vinylmethylpolysiloxanes, vinylphenylpolysiloxanes, etc. These compositions can be blended with high ratios of polybutadiene to yield products possessing excellent physical properties.

Although the mechanism of the cure is not fully understood at this time, it is believed that cross-linking takes place at the points of unsaturation of each polymer as well as at other sites which are sensitive to free-radicals, e. g. methyl groups, etc.

EXAMPLE 11

A vinylmethylpolysiloxane gum was prepared by polymerizing octamethylcyclotetrasiloxane containing 0.2 mole per cent of tetramethyltetravinylcyclotetrasiloxane in the presence of 0.01% KOH, based on total weight of the siloxanes, to yield a gum having a room temperature viscosity of about $1 \times 10^6$ centipoises.

EXAMPLE 12

A series of compositions were prepared by blending on a rubber mill (1) 100 parts of the vinylmethylpolysiloxanes prepared in Example 11; (2) 35 parts of silica aerogel (Santocel C); (3) 2 parts of zinc oxide; (4) 3 parts of di-$\alpha$-cumyl peroxide; and varying amounts of the sodium polybutadiene prepared in Example 1. These compositions were cured in a mold for 30 minutes at 170° C. and their tensile strengths measured at room temperature and at 150° C. The results are presented in Fig. 2.

EXAMPLE 13

A devolatilized vinylmethylpolysiloxane was prepared in the same manner as Example 11 except that the product was washed with water and devolatilized by steam.

EXAMPLE 14

A series of compositions were prepared by blending on a rubber mill (1) 100 parts of the devolatilized vinylmethylpolysiloxane prepared in Example 13; (2) 35 pars of a silica aerogel (Santocel C); (3) 2 parts of zinc oxide; (4) 8 parts of di-$\alpha$-cumyl peroxide; and (5) varying amounts of the sodium polybutadiene prepared in Example 1. These compositions were cured in a mold for 30 minutes at 170° C. and their tensile strength measured at room temperature and at 150° C. These results are presented in Fig. 3.

EXAMPLE 15

A vinylmethylphenylpolysiloxane was prepared by copolymerizing 100 parts of octamethylcyclotetrasiloxane, 15 parts of octaphenylcyclotetrasiloxane, and 0.023 part of tetramethyltetravinylcyclotetrasiloxane in the presence of about 0.01% KOH based on total weight of the siloxanes. The steam devolatilized product has a room temperature viscosity of about $1 \times 10^6$ centipoises.

EXAMPLE 16

A series of compositions were prepared by blending on a rubber mill (1) 100 parts of the vinylphenylpolysiloxane prepared in Example 15; (2) 35 parts of silica aerogel (Santocel C); (3) 2 parts of zinc oxide; (4) 3 parts di-α-cumyl peroxide; and (5) varying amounts of the sodium polybutadiene prepared in Example 1. These compositions were cured in a mold for 30 minutes at 170° C. and their tensile strength measured at room temperature and at 150° C. The results are presented in Fig. 4.

From the above figures, it is evident that the polybutadiene markedly improves the tensile strength of organopolysiloxane.

In addition to the silica employed in the above examples, other fillers can be employed. Examples of such fillers are lithopone, comminuted glass, asbestos, zinc oxide, talc, ferric oxide, titanium oxide, many varieties of carbon black, silica, alumina, and calcium silicate as disclosed in application Serial No. 509,387, Precopio et al., filed May 18, 1955, and assigned to the same assignee as the present application, silicas rendered hydrophobic by surface treatment with (1) alcohols in the manner as disclosed in 2,657,149, Iler, and (2) trialkyl silanes in the manner of Bueche et al., application Serial No. 531,829, filed August 31, 1955, and assigned to the same assignee as the present application. Other fillers used in natural and synthetic rubber can also be employed. For each 100 parts of polymer, we can employ from 0–100 parts of filler, but preferably 25–50 parts.

Because di-α-cumyl peroxide is sometimes sensitive to milling at elevated temperatures, particularly in the presence of silica, it is advantageous to add certain basic materials, such as those described in application No. 554,627, Safford et al., filed December 22, 1955, and assigned to the same assignee as the present application.

The products of this invention possess excellent heat stability and have been exposed to temperatures as high as 200° C. for periods of over 100 hours with little change in properties.

Because of the enhanced properties of the products of this invention, they can be used in applications where one desires to use silicone compositions of improved tensile strength. The products of this invention can also be used in high temperature applications where cost factors prohibit the use of unblended silicone rubber. The products of this invention can be used as elastomers, as hot strength films or tapes, for electrical parts, such as insulation, as conduits, or containers for hot liquids, etc.

What we claim as new and desire to secure by Letters Patent of the United States is:

1. A curable composition comprising a blend of (1) an organopolysiloxane curable to the elastic state and selected from the class consisting of hydrocarbon substituted and halohydrocarbon substituted organopolysiloxanes, (2) a rubbery polymer of polybutadiene, and (3) di-α-cumyl peroxide.

2. The composition of claim 1 wherein the polybutadiene comprises at least 30% 1,2-polybutadiene.

3. The product of claim 1 which has been cured by heating to a temperature in the range of 150° C. to just below the decomposition point of the polymer.

4. A curable composition comprising a blend of (1) an organopolysiloxane curable to the elastic state and selected from the class consisting of hydrocarbon substituted and halohydrocarbon substituted organopolysiloxanes, (2) a rubbery polymer of polybutadiene, (3) a filler, and (4) di-α-cumyl peroxide.

5. The composition of claim 4 wherein the polybutadiene comprises at least 30% 1,2-polybutadiene.

6. The product of claim 4 which has been cured by heating to a temperature in the range of 150° C. to just below the decomposition point of the polymer.

7. A process of curing blends of an (1) organopolysiloxane curable to the elastic state and selected from the class consisting of hydrocarbon substituted and halohydrocarbon substituted organopolysiloxanes, and (2) a rubbery polymer of polybutadiene which process comprises heating said blends to a temperature in the range of 150° C. to just below the decomposition point of the polymer in the presence of di-α-cumyl peroxide.

8. The process of claim 7 wherein the polybutadiene comprises at least 30% 1,2-polybutadiene.

9. The process of curing blends of an (1) organopolysiloxane curable to the elastic state and selected from the group consisting of hydrocarbon substituted and halohydrocarbon substituted organopolysiloxanes, (2) a rubbery polymer of polybutadiene, and (3) a filler which process comprises heating said blend to a temperature in the range of 150° C. to just below the decomposition point of the polymer in the presence of di-α-cumyl peroxide.

10. The process of claim 9 wherein the polybutadiene comprises at least 30% 1,2-polybutadiene.

11. A curable composition comprising a blend of (1) a dimethylpolysiloxane curable to the elastic state, (2) a rubbery polymer of polybutadiene comprising at least 30% 1,2-polybutadiene, and (3) di-α-cumyl peroxide.

12. The product of claim 11 which has been cured by heating to a temperature in the range of 150° C. to just below the decomposition point of the polymer.

13. A curable composition comprising a blend of (1) a vinylmethylpolysiloxane curable to the elastic state, (2) a rubbery polymer of polybutadiene comprising at least 30% 1,2-polybutadiene, and (3) di-α-cumyl peroxide.

14. The product of claim 13 which has been cured by heating to a temperature in the range of 150° C. to just below the decomposition point of the polymer.

15. A curable composition comprising a blend of (1) a vinylmethylphenylpolysiloxane curable to the elastic state, (2) a rubbery polymer of polybutadiene comprising at least 30% 1,2-polybutadiene, and (3) di-α-cumyl peroxide.

16. The product of claim 15 which has been cured by heating to a temperature in the range of 150° C. to just below the decomposition temperature of the polymer.

17. A curable composition comprising a blend of (1) a dimethylpolysiloxane curable to the elastic state, (2) a rubbery polymer of polybutadiene comprising at least 30% 1,2-polybutadiene, (3) a filler, and (4) di-α-cumyl peroxide.

18. The product of claim 17 which has been cured by heating to a temperature in the range of 150° C. to just below the decomposition temperature of the polymer.

19. A curable composition comprising a blend of (1) a vinylmethylpolysiloxane curable to the elastic state, (2) a rubbery polymer of polybutadiene comprising at least 30% 1,2-polybutadiene, (3) a filler, and (4) di-α-cumyl peroxide.

20. The product of claim 19 which has been cured by heating to a temperature in the range of 150° C. to just below the decomposition temperature of the polymer, 21. A curable composition comprising a blend of (1) a vinylmethylphenylpolysiloxane curable to the elastic state, (2) a rubbery polymer of polybutadiene comprising at least 30% 1,2-polybutadiene, (3) a filler, and (4) di-α-cumyl peroxide.

22. The product of claim 21 which has been cured by heating to a temperature in the range of 150° C. to just below the decomposition temperature of the polymer.

References Cited in the file of this patent

UNITED STATES PATENTS 2,710,290     Safford et al. _____ June 7, 1955